United States Patent [19]

Brinkmeyer et al.

[11] Patent Number: 4,923,290

[45] Date of Patent: May 8, 1990

[54] POLARIZATION SCRAMBLER

[75] Inventors: Ernst Brinkmeyer, Buchholz; Wolfgang Brennecke; Rainer J. R. W. Otto, both of Hamburg, all of Fed. Rep. of Germany

[73] Assignee: U.S. Philips Corp., New York, N.Y.

[21] Appl. No.: 232,741

[22] Filed: Aug. 16, 1988

[30] Foreign Application Priority Data

Aug. 22, 1987 [DE] Fed. Rep. of Germany ....... 3728107

[51] Int. Cl.$^5$ ............................................. G02F 1/09
[52] U.S. Cl. .................................. 350/377; 350/96.13; 350/371
[58] Field of Search ............... 350/371, 372, 373, 375, 350/376, 377, 378, 403, 96.13, 96.14, 393

[56] References Cited

U.S. PATENT DOCUMENTS

| | | | |
|---|---|---|---|
| 2,780,958 | 2/1957 | Wiley | 350/403 |
| 3,239,671 | 3/1966 | Buhrer | 350/403 |
| 3,407,364 | 10/1968 | Turner | 350/393 |
| 3,435,228 | 3/1969 | Gordon | 350/371 |
| 3,484,151 | 12/1969 | Turner | 350/403 |
| 3,558,214 | 2/1971 | Lang et al. | 350/403 |
| 3,558,215 | 1/1971 | Lang et al. | 350/403 |
| 3,645,603 | 2/1972 | Smith | 350/371 |
| 4,097,110 | 6/1978 | Carey | 350/371 |
| 4,222,668 | 9/1980 | Henry | 350/377 |

FOREIGN PATENT DOCUMENTS 3530738 3/1987 Fed. Rep. of Germany ...... 350/375

OTHER PUBLICATIONS

*Electronics Letters* (vol. 23, No. 12, pp. 634–636), Kersey et al., "Monomode Fibre Polarization Scrambler," Jun. 4, 1987.

Primary Examiner—Rodney B. Bovernick
Assistant Examiner—Martin Lerner
Attorney, Agent, or Firm—William L. Botjer

[57] ABSTRACT

The invention relates to a polarization scrambler comprising a controllable optical phase retardation element for retarding with respect to one another components of a light beam with a different state of polarization, the light beam propagating through the element, and a control arrangement for controlling the phase retardation element, said control arrangement being adapted to supply a control signal so that as a function of time the phase retardation is controlled in such a way that with a given state of polarization (SOP) of the light entering the polarization scrambler varying states of polarization occur at its output in such a way that, averaged in time, the light intensities emerging in each SOP are at least substantially equal. An arrangement suitable for arbitrary input states of polarization is obtained when at least a further controllable phase retardation element (2, 3) connected to a control arrangement and succeeding the first element in the light propagation direction is provided which, represented on the Poincaré sphere, creates states of polarization in accordance with a rotational axis which is different from that associated with the first phase retardation element and in that the phase retardation elements (1, 2, 3) are controlled by the control arrangement at different frequencies ($f_1$, $f_2$, $f_3$) or in an uncorrelated aperiodical manner.

19 Claims, 1 Drawing Sheet

POLARIZATION SCRAMBLER

BACKGROUND OF THE INVENTION

The invention relates to a polarization scrambler comprising a controllable optical retardation element of which the retardation is controllable as a function of time by a control arrangement in such a way that with a given state of polarization (SOP) of the light entering the polarization scrambler varying states of polarization occur at its output in such a way that, averaged in time, the light intensities emerging in each SOP are at least substantially equal.

Such an arrangement is known from Electronics Letters, Vol. 23, No. 12, pp. 634 and 635.

In optical transmission systems a transmission light source, particularly a laser, may precede optical elements whose behaviour is dependent on the state of polarization (SOP) of the light. For example, the transparency of a beam splitter may depend on the SOP of the input light. Unambiguous transmission ratios are achieved if a constant SOP throughout a transmission path could be guaranteed. If at all, this could only be achieved by means of cumbersome control processes.

Particularly when light waveguides (i.e. optical fibres) which are not specifically polarization maintaining fibres are arranged in the transmission path, it is inevitable that these conventional light waveguides induce SOP variations due to their properties of birefringence as a function of time.

In the case mentioned in the opening paragraph these difficulties should be eliminated by passing input light having a known SOP via a polarization scrambler so that light having a periodically varying SOP as a function of time is produced at its output. It is true that less light power than is possible in the case of optimum adaptation is available at the output of the polarization scrambler in a given polarization plane, but this light power, averaged in time, is constantly transmitted even when the polarization rotations of the transmission path fluctuate accidentally.

Special problems occur in backscattering meters or reflectometers with which the attenuation behaviour of monomode light waveguides is measured (OTDR). Since the backscattering signals in monomode light waveguides are much smaller than, for example in multimode light waveguides, a heterodyne reception is advantageous. The backscattering signals are then superimposed with a local oscillator beam (LO) having a different light frequency. The intermediate frequency signals produced are analyzed. These signals can provide information when the SOPs of the LO and the backscattering signals are in a fixed relationship and, in the ideal case, are equal. Such a presumption is not given due to the fact that the SOP is influenced in an accidentally varying manner by the light waveguide to be measured.

The laser light used for the measurement can be depolarized by means of a depolarizer. (Compare Optical and Quantum Electronics 15, pp. 281–287). If a so-called pig-tail were used for this purpose, in which the states of polarization of the light components having different wavelengths are naturally attenuated to a different extent, extremely long pig-tails would be required for narrow band transmission light (for example 100 kHz).

When using a polarization scrambler of the type described in the opening paragraph it is a prerequisite that the SOP of the input light is invariable and that the position of the polarization scrambler is exactly associated therewith. Such a polarization scrambler must thus be arranged at the area where the SOP is still practically stable, i.e. particularly at the output of a laser.

SUMMARY OF THE INVENTION

It is an object of the invention to realize the arrangement of the type described in the opening paragraph in such a way that it is more versatile.

This object is realized in that at least a further retardation element controllable by a control arrangement and following the first element in the light proparation direction is provided, which element, represented on the Poincaré sphere, creates states of polarization in accordance with a rotational axis which is different from that associated with the first retardation element and in that the retardation elements are controllable by the control arrangements at different frequencies or in an uncorrelated aperiodical manner.

As an accurately defined input-SOP is required in the known case, the operation of the polarization scrambler according to the invention is completely independent of the input-SOP, with equally good results The arrangement according to the invention can thus be provided at any location in a transmission path and in a heterodyne reflectometer it can also be provided directly before the superimposition location of the LO signal with the backscattering signal in the LO branch, because in this branch a small, polarization scrambler-conditioned attenuation of the LO energy, which is sufficiently large anyway, is absolutely not critical.

Linear retardation elements are those which have different, and in the case of the present invention controllable, refractive indices in two principal axes which extend to the direction of light propagation and which are perpendicular to each other. The state of polarization of incident light is then changed in so far as it did not originally coincide with one of the two principal axes. Such an effect can be achieved in discrete components, for example electro-optically by means of an electric field (Kerr effect) or also in fibre-optic light waveguides or in a planar light waveguide by applying a mechanical stress (stress birefringence, compare Electronic Letters 1986, Vol. 22, p. 1342).

Circular retardation elements are particularly Faraday rotators in which the state of polarization is rotated by the influence of a magnetic field extending in the direction of light propagation, for example in a light waveguide (compare Electronic Letters 1985, Vol. 21, p. 788).

the representation of all feasible states of polarization on the so-called Poincaré sphere and its use to explain the operation of retardation elements is known to those skilled in the art, for example also from the document mentioned in the opening paragraph or in Appl. Phys. Lett. 35, pp. 840–842.

Whilst in the known case states of polarization are traversed only on a rotational line of the surface of the Poincaré sphere, a selection of the SOPs marked on the overall surface of the Poincaré sphere is traversed at any arbitrary input-SOP for only two retardation elements, so that always the same power, averaged in time, is measured via an arbitrary elliptical state of polarization.

For the invention the principle already known for polarization controllers (Appl. Phys. Lett. 35, pp.

810–841 or Electronics Letters 1986, p. 1342) is used, which principle implies that any surface point on a Poincaré sphere can be reached by means of a plurality of adjustable retardation elements. According to the invention these adjusting elements are controlled by means of fixed but mutually different frequencies so that during an averaging interval a defined number of states of polarization distributed on the entire surface of the Poincaré sphere is automatically traversed at least once, but preferably several times. The same effect can of course also be achieved by an uncorrelated aperiodical control of the retardation elements if their retardation angles are controlled, for example by mutually independent noise generators.

Therefore, in a further embodiment the control frequencies for generating the periodically varying retardations of the retardation elements as well as their differential frequencies are larger than the reciprocal value of a measurement interval for capturing the output light of the polarization scrambler.

The surface area of the Poincaré sphere is covered to a sufficiently complete extent if the linear retardation elements are controlled in such a way that the retardation values are varied in a time-dependent manner about a differential angle in the range of 0 to $2\pi(1 \pm 0.1)$ particularly approximately $2\pi$. Particularly in the case of uncorrelated aperiodical control the differential angles should be approximately evenly distributed in the overall interval.

It is fundamentally possible to use one linear retardation element and one circular retardation element or at least two linear retardation elements. A very suitable distribution of SOPs is achieved in that the constant time-dependent variation of a triangular curve differs to a smaller extent at any instant than corresponds to the positive or negative difference from an envelope sine curve.

The force required for a controllable stress birefringence may be generated electro-magnetically or piezo-ceramically (compare Electronic Letters 1986, p. 1181). A pressure or also a bending force can be formed in the retardation element, for example in a light waveguide.

In accordance to a particularly simple solution it is provided that a linear retardation element for creating stress birefringence comprises as piezo-ceramical pressure generator to the control terminals of which an AC-current is connectable.

Alternatively it is possible that a bending device is associated with a monomode light waveguide.

BRIEF DESCRIPTION OF THE DRAWINGS

The invention will now be described in greater detail, by way of example, with reference to the accompanying drawings in which.

DESCRIPTION OF THE PREFERRED EMBODIMENT

Figure 1:
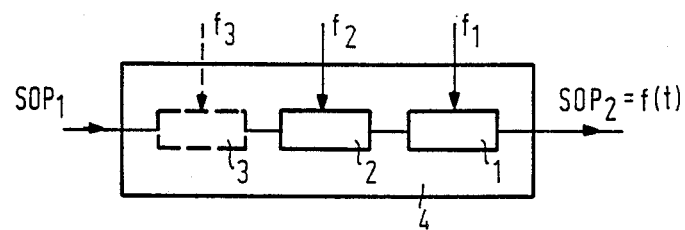
FIG. 1 is a basic circuit diagram of a polarization scrambler according to the invention.

FIG. 1 diagrammatically shows a polarization scrambler 4 with three retardation elements 1, 2 and 3 which can operate linearly or also circularly in so far as at least one linearly operating element is provided.

A third retardation element 3 is generally not required but in particularly difficult cases it can be used for further scrambling of the SOP.

At an arbitrary input-$SOP_1$ a $SOP_2$ is produced at the output which changes as a function of time and assumes a weighted selection of the overall number of the SOPs marked on a Poincaré sphere.

The frequencies $f_1$, $f_2$ and $f_3$ at which the physical properties of the retardation elements 1, 2 and 3 realising a retardation are periodically changed must be different from one another. The durations of the periods of these frequencies and their differential frequencies should be smaller and possibly considerably smaller than an averaging interval in which, for example a measuring process is performed to establish the attenuation behaviour of a monomode light waveguide.

Figure 2:
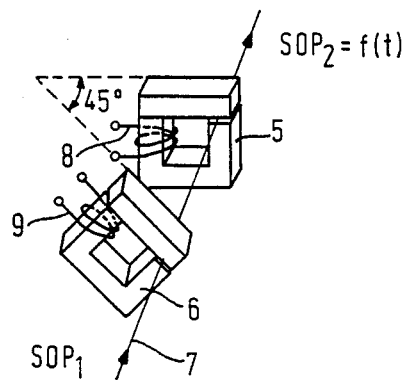
FIG. 2 shows a preferred embodiment, using electro-magnetic pressure generators.

In a practical application for a heterodyne OTDR two electro-magnetic pressure generators 5 and 6 according to FIG. 2 were used which clamp as close as possible sections of a monomode light waveguide (optical fibre) 7 in a 45°-shifted position between the ferromagnetic Yoke and the ferro-magnetic armature. A current having a frequency $f_1 = 20$ Hz was passed through the operating coil 8 and a current having a frequency $f_2 = 17.3$ Hz was passed through the operating coil 9, which alternating currents were each superimposed on a direct current.

The amplitudes of these alternating currents were given in such a way that difference of the retardation angle $\Psi$ of $2\pi$ resulted between the positive and negative maximum values. The symbol $\Psi$ is the phase difference of two waves polarized in the principal axes.

Figure 3:
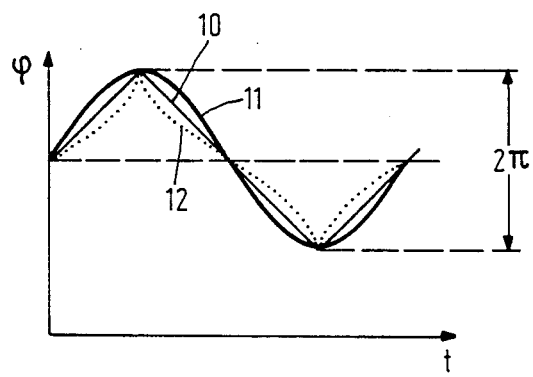
FIG. 3 shows a favourable variation of the retardation angles of the retardation elements.

The shape of the curve of the alternating currents was chosen to be such that a retardation angle variation as a function of time t and according to characteristic curve 10 in FIG. 3 was the result. It holds that the retardation angle $\Psi$ is approximately proportional to the pressure force of the pressure generators 5 and 6 and that the alternating component of the pressure force in the selected current range is approximately proportional to the alternating components of the currents in the operating coils 8 and 9. Alternatively, the force exerted upon the monomode light waveguide 7 can be generated by piezo-ceramic pressure generators. A similar effect can also be achieved by properly controlled bending of the monomode light waveguide 7.

In the arrangement of FIG. 2 light was coupled-in with different input states of polarization. The output power was detected by means of a Soleil-Babinet compensator and a polarizer at different states of polarization.

The value of the output power averaged with respect to time varied in dependence upon the selected states of polarization by about $\pm 1\%$.

It was shown that relatively large deviations from the optimum adjustments of the spatial rotation angle between the pressure generators 5 and 6, of the shift of the retardation angle and the shape of the curve of the variation as a function of time of the retardation angle (optimum in accordance with characteristic curve 10, variations in the range between the envelope sine line 11 and its mirror curve 12 in FIG. 3 were permitted) do not essentially increase the fluctuation width of the time average of the output power. The optimum values should be aimed at, but extraordinary care is not required for their setting.

A particular advantage of the arrangement according to FIG. 2 is that the optical path of the retardation elements is a monomode light waveguide 7 which can be coupled without any problem to other monomode light waveguides in a transmission path or which may be a part which is already present in the transmission path.

The arrangement of FIG. 2 was integrated in a heterodyne reflectometer in the LO branch in order that polarization fluctuations particularly occurring in the measuring fibre were averaged out. The signal-to-noise ratio was considerably increased thereby. Consequently larger light waveguide lengths could be measured. With the same measuring duration a longer range of the reflectometer, or shorter measuring times at the same range are the result because a smaller multitude of repetitive measurements to be averaged statistically is sufficient.

The polarization scrambler according to the invention may be used wherever a measuring result, averaged in time, and being independent of polarization effects is desired.

What is claimed is:

1. A polarization scrambler for light comprising a controllable optical retardation element of which the retardation is controllable as a function of time by a control arrangement in such a way that with a given stat of polarization of light entering the polarization scrambler, varying states of polarization occur at its output in such a way that, averaged in time, light intensities emerging in each state of polarization are at least substantially equal, characterized in that at least a further retardation element controllable by a control arrangement and following a first element in a light propagation direction is provided which element, represented on a Poincaré sphere, creates states of polarization in accordance with a rotational axis which is different from that associated with the first retardation element and in that the retardation elements (1, 2, 3) are controllable by the control arrangements at different frequencies ($f_1$, $f_2$, $f_3$) or in an uncorrelated aperiodical manner.

2. An arrangement as claimed in claim 1, characterized in that the retardation elements are two linear retardation elements (5, 6) whose principal axes extend to each other in an acute angle in a range between 25° and 65°, preferably approximately 45°.

3. An arrangement as claimed in claim 2, characterized in that the retardation of the linear retardation elements (5, 6) is achievable by stress birefringence.

4. An arrangement as claimed in claim 3, characterized in that the linear retardation elements comprise a monomode light waveguide (7) and two pressure generators (5, 6), which pressure generators are arranged one after the other in a light waveguide direction and with an angularly displaced pressure direction on the light waveguide (7).

5. An arrangement as claimed in claim 4 characterized in that the pressure generators comprise a ferromagnetic yoke, a ferro-magnetic armature and an operating coil (8, 9), which operating coil is AC-controllable so that an electro-magnetically generated force is applicable to the monomode light waveguide to create stress birefringence.

6. An arrangement as claimed in claim 4 characterized in that a linear retardation element for creating stress birefringence comprises a piezo-ceramical pressure generator to which an AC-current is connected.

7. An arrangement as claimed in any one of claim 2, characterized in that the control arrangements for the linear retardation elements are adapted to generate control signals which produce retardation values are variable in a time-dependent manner about a differential angle of 0 to $2\pi(1\pm0.1)$, particularly approximately $2\pi$.

8. An arrangement as claimed in claim 7, characterized in that the control arrangements are adapted to generate control signals at which constant time-dependent variation of a triangular curve differs at any instant to a smaller extent than corresponds to a positive or negative difference with an envelope sine curve.

9. An arrangement as claimed in claim 1, characterized by the use of a linear and a circular retardation element.

10. An arrangement as claimed in claim 9, characterized in that the circular retardation element is a Faraday rotator.

11. An arrangement as claimed in claim 9, characterized in that the control arrangements for the circular retardation elements are adapted to generate control signals which produce a retardation so that rotation of the polarization plane varies in a time-dependent manner in an angular range of 0 to $\pi(1\pm0.1)$, particularly approximately $\pi$.

12. An arrangement as claimed in claim 1, characterized in that control frequencies ($f_1$, $f_2$, $f_3$) for generating periodically alternating retardations of the retardation elements (1, 2, 3 and 5, 6) as well as frequency differences are larger than a reciprocal value of a measurement interval for capturing output light of the polarization scrambler.

13. An arrangement as claimed in any one of claims 4, 7, 8, 11 or 12 characterized in that a bending device is associated with a monomode light waveguide.

14. A scrambler for altering the state of polarization of light comprising:
first and second optical retardation elements, the amount of retardation of said retardation elements being controllable as a function of time by means of a control input;
control means for controlling said first and second retardation elements, said control means controlling said second retardation element such that the second retardation element, as represented on the Poincaré sphere, alters the states of polarization in accordance with a rotational axis which is different from that associated with said first retardation element and that said control means are controllable at at least one of, differing frequencies, and in an uncoordinated aperiodic manner such that varying states of polarization occur at the output of the second retardation element in such a way that, averaged in time, the light intensities emerging in different states of polarization are at least substantially equal.

15. The polarization scrambler as claimed in claim 14 wherein said retardation elements comprise two linear retardation elements having principle axes extending at an acute angle to each other in the range between 25° and 65°.

16. The polarization scrambler as claimed in claim 14 wherein said retardation elements comprise linear retardation elements operating by the principle of stress birefringence.

17. The polarization scrambler as claimed in claim 14 wherein at least one of said first and second optical retardation elements comprise a circular retardation element in the form of a faraday rotator.

18. The polarization scrambler as claimed in claim 17 wherein said pressure generators comprise a ferro-magnetic yoke, a ferro-magnetic armature and an operating coil which is controlled by the application of alternating current so that an electromagnetically generated force is applied to the monomode light waveguide to create stress birefringence.

19. The polarization scrambler as claimed in claim 14 wherein said first and second optical retardation elements comprise linear retardation elements including a monomode light waveguide and two pressure generators which are arranged sequentially along said waveguide and which are angularly displaced with respect to the direction of pressure exerted on said waveguide.

* * * * *